Patented Oct. 15, 1940

2,218,172

UNITED STATES PATENT OFFICE 2,218,172

PREPARATION FOR ANTISEPSIS OF THE ORAL CAVITY

Vaman R. Kokatnur, New York, N. Y., assignor to Autoxygen Inc., New York, N. Y., a corporation of New York No Drawing. Application October 13, 1934, Serial No. 748,212

5 Claims. (Cl. 167—93)

The present invention relates to improvements in oral and dental hygiene and it particularly relates to liquid, paste, powder, and/or plastic compositions adapted to bring about most efficient oral and dental hygienic conditions.

In the field of oral and dental hygiene there are on the market large numbers of various preparations taking the form of tooth pastes, tooth powders, mouth washes, chewing gums, and so forth, which materials are designed or advertised to be effective as cleansing and/or hygienic agents for the oral cavity.

As a general rule, the antiseptic qualities of these various compositions in the oral cavity are of a very low order, if they exist at all, and the antiseptic agents contained in these materials are either of such a character as to be of insufficient strength to cause any substantial amount of antisepsis, or if they are sufficiently strong they cause injury to the tissues of the mouth and/or to the structure of the teeth.

Where the antiseptic reagent contained in the composition is of oxidizing character, its oxidizing power is rapidly reduced after introduction into the mouth at the temperature and alkaline conditions present in the mouth cavity and in contact with the various organic and inorganic substances also present in the saliva and other fluids and/or to the surfaces in such mouth cavity.

The usual oxidizing antiseptic reagents, such as chlorine or iodine compositions or compounds, hydrogen peroxide, perborates, and so forth, will liberate oxygen at a very rapid rate in its least active form, with the result that any antiseptic effect will be extremely transitory and substantially no antisepsis will be obtained in a more or less remote place in the oral cavity, such as for example, in the crevices between the teeth where it is most important that thorough hygiene be obtained.

In addition such oxidizing agents usually cannot be conveniently combined with the usual type of tooth cleansing compositions such as pastes, because of their inherent instability and tendency to decompose when combined with diluents and other necessary and desirable materials. For this reason most tooth paste compositions or tooth powders have to be prepared relatively devoid of antiseptics, such as above mentioned, since such antiseptics would rapidly decompose on standing, or so shortly after introduction into the mouth as to be of little effect and value.

In addition most of these antiseptic materials are either of an alkalinity or acidity substantially removed from that of the oral cavity, with the result that their relatively strong alkaline or acid reaction upon the tooth structure or membranes of the oral cavity would be rather deleterious than otherwise and they would have a disadvantageous effect upon the calcification of the tooth structure and upon the firmness and hardness of the gum tissues.

An object of the present invention is to provide an improved method of oral and dental antisepsis involving the utilization of an inexpensive, readily available, harmless, non-corrosive antiseptic agent which will be relatively stable at the temperatures and alkalinities and in the presence of substances occurring in the oral cavity, and which will exert its antiseptic power over long periods of time when placed in the oral cavity.

Another object is to provide an improved antiseptic and cleansing composition for oral and dental hygiene purposes, the active element of which will consist of an antiseptic compound, of high stability and/or hypertonic qualities, and which may readily be combined with varous diluents or other desirable agents, such as water, glycerine, abrasives, and so forth, in tooth pastes or powders, mouth washes, chewing gum, and so forth, without decomposition and disadvantageously affecting the antiseptic properties when utilized.

Other objects will appear during the course of the following specification.

In accomplishing the above objects it has been found that certain types of double, triple, or quadruple oxygen chains when joined to carbon atoms or to organic radicals of aliphatic, alicyclic, aromatic aroaliphatic, heterocyclic, or ali-aromatic character, are particularly stable in the oral cavity and at the temperatures and alkalinities existing therein, and in the presence of the various enzymes and other fluids normally present.

These compounds are desirably of substantially neutral character, neither strongly alkaline nor strong acidic and they are preferably used with inert diluents suitable for oral and dental hygiene which do not possess an oily, waxy, unctuous, greasy or fatty character and/or which do not prevent wettability or resist wetting by saliva.

The compounds most desirably used are those which are solids or liquids at temperatures ranging from the lowest normal room temperature to substantially above the body temperature, and which will only decompose at a relatively slow rate even when contacted with enzymes in the saliva or at pH values usually existent in the mouth. The preferred compounds also should be relatively stable in contact with the enzymes of the saliva and mouth fluids, and in the presence of insoluble salts of alkali earth metals, such as for example, calcium carbonate, calcium phosphate, and/or in the presence of alkaline materials such as slaked lime, bicarbonate of soda, or salts such as sodium chloride, and so forth.

As examples of compounds which may be desirably utilized are peroxy compounds such as peroxides containing one, two or more similar or dissimilar acyl, alkyl, aralkyl, heterocyclic, alicyclic, aliaryl and aryl radicals.

For example among the peroxy compounds which have been found to be satisfactory are benzoyl peroxide, salicyl peroxide, cinnamyl peroxide and certain higher fatty acid peroxides. The peroxides preferably contain similar or dissimilar organic radicals, each containing four or more carbon atoms.

It is to be understood that stable peroxy compounds such as alkyl peroxides, ether peroxides, ketone peroxides, aldehyde peroxides, acid peroxides, peracids, ester peroxides, or organic ozonides such as may be readily produced from oils, as olive oil, linseed oil, turpentine, and so forth, may be employed.

Among the specific compounds which may be employed in addition to, in lieu of, and/or in combination with the above mentioned benzoyl peroxide are peroxy compounds of toluic acid, cinnamic acid, camphoric acid, phenylacetic acid, butyric acid, caproic acid, caprylic acid, valeric acid, crotonic acid, capric acid, lauric acid, palmitic acid, stearic acid, myristic acid, metaxylic acid, succinic acid, fumaric acid and peroxy compounds of benzaldehyde, acetone, dipropyl ketone, and other ketones, aldehydes and alcohols.

These compounds are preferably used in compositions containing diluents and other ingredients which will permit ready wetting of the peroxy compounds by the saliva and mouth fluid, and the diluents whether solid or liquid should preferably be of a non-fatty, non-greasy, non-waxy, or non-oily nature, and should be chemically relatively inert toward the peroxide.

Where the diluent is a liquid, such as alcohol, liquid peroxides may be satisfactorily employed, but where the diluent is a solid composition it is usually desirable to use a solid peroxide.

The following examples will illustrate several specific embodiments of the present invention.

Example I

In forming a tooth paste, a paste mixture is made from:

| | Parts |
|---|---|
| Precipitated chalk | 35 |
| Precipitated tricalcium phosphate | 20 |
| Neutral soap powder | 15 |
| Calcium chloride | 2 |
| Salt | 2 |
| Benzoyl peroxide | 25 |
| Glycerine | 60 |
| Water | 60 |
| Gum | 30 |
| Oil of cloves | 1 |
| Oil of wintergreen | 2 |
| Oil of peppermint | 2 |
| Oil of geranium | 1 |

The composition is a paste which may be readily dispensed from collapsible tubes and the benzoyl peroxides will be stable even though the composition be stored for long periods of time.

Example II

In forming a mouth wash, 5 parts of benzoyl peroxide may be dissolved in about 100 parts of grain alcohol. To this then may be added as much of a solution containing 95 parts of water, 2 parts of salt, 2 parts of sodium bicarbonate and 1 part of soap as will approximate the point of precipitation of the benzoyl peroxide. The whole may be flavored with one to two parts of peppermint oil.

As another mouth wash composition it is possible to dissolve a liquid peroxide, such as diethyl, dipropyl and/or dibutyl peroxide in alcohol and/or in other suitable liquids.

Such peroxy compounds may also be prepared as mouth washes in the form of emulsions or colloidal suspensions alcohol and/or other suitable liquids.

Example III

To prepare a composition which will stay in the mouth cavity for long periods of time to assure desirable antisepsis, a chewing gum composition may be utilized to carry the peroxide.

To form such a compound, 45 parts of molten gum chicle and 40 parts of powdered sugar or an equivalent amount of a sugar syrup may be combined with 10 parts of benzoyl peroxide, 2 parts of salt and 2 parts of trisodium phosphate.

These materials may be mixed together by kneading and flavored with 1 to 2 parts of spearmint. The material may then be rolled in the form of thin sheets and cut into popular sizes and wrapped with paper for the market.

The benzoyl peroxide and/or other peroxy compound may be coated upon pellets either by precipitation and/or by preparing a coating.

It is to be understood that the composition may also be prepared in the form of lozenges, the peroxy compound either taking the form of a coating on such a lozenge or being dispersed throughout the mass of such a lozenge. The peroxide or ozonide composition may be applied either as a coating on said lozenges or it may be dispersed throughout the mass of sugar or other material making up the lozenge.

In addition to the diluents above described other diluents may be satisfactorily employed, such as agar-agar, pectin and gelatin materials, dextrin, gum tragacanth, gum acacia, locust bean gum, and so forth. The peroxy compositions of the present application may also be absorbed in or on porous materials, such as charcoal, or they may be mixed with flour, paraffin, or waxy, fibrous and/or plastic materials.

The chewing gum, liquid, paste, or powder compositions above disclosed function most efficiently in oral and dental hygiene and assure antisepsis of even remote places in the mouth, such as the crevices between the teeth.

The oxidizing power of the compositions is effective over long periods of time and the oxygen which is liberated by the peroxide appears to be in a particularly active form. It has been found as a result of tests that bacterial growths in the mouth, teeth and throat are very quickly killed by the compositions of the present invention containing benzoyl peroxide or other peroxy compounds.

In addition not only does the benzoyl peroxide assure thorough antisepsis but in the case of tooth pastes and powders the abrasives present assure a thorough cleansing action.

The chewing gum composition is particularly suitable inasmuch as it stimulates the flow of saliva, and in stimulating the flow of the saliva, assures a suitable slow nascent oxygen-liberating catalysis of the oxygen chain compound.

It is to be understood that various mixtures of the oxygen chain compounds may be utilized and various peroxides may be mixed together and that the proportions and ingredients of the above examples may be widely varied without departing from the scope of the invention as exemplified in the accompanying claims.

The various peroxy compounds may be made by any suitable processes, and may be prepared by irradiation and such oxidizing compounds may be combined with various vehicles and diluents or other ingredients suitable for oral hygiene purposes which will not disadvantageously affect the peroxy compound or the tissues and structures in the oral cavity.

It is to be understood that the phrase organic peroxy compounds used in the specification and claims includes peroxides, peracids, ozonides, ozonide peroxides or compounds containing the peroxidic or ozonidic groupings —O—O— and —O—O—O—.

It will be noted that in each of the compositions above, there is employed an alkaline material, either in water soluble or in water insoluble condition, which will give an alkaline condition to the composition, and which also will assure the release of the active oxygen in an alkaline environment.

The various alkaline materials employed are: precipitated chalk and precipitated tricalcium phosphate in Example I; a sodium bicarbonate and soap in Example II; and trisodium phosphate in Example III.

In addition to the alkaline material it is also desirable to use a mutual solvent for the organic peroxide, which will bring said organic peroxide into slow solution into the oral cavity, these materials preferably being glycerine in Example I, grain alcohol in Example II, and to a limited degree sugar syrup or powdered sugar in Example III.

Having thus described my invention, what I claim as new and desire to secure by Letters Patent is:—

1. A composition for antisepsis of the oral cavity capable of being prepared in the form of a paste, powder, liquid or chewing gum, said composition being of substantial alkaline character and including as the active antiseptic agent an organic peroxidic compound and also including a substance which is a mutual solvent of saliva and of the peroxidic compound, whereby to facilitate liberation of nascent oxygen in direct contact with the pathogenic organisms to be destroyed.

2. A composition for antisepsis of the oral cavity capable of being prepared in the form of a paste, powder, liquid or chewing gum, said composition being of substantial alkaline character and including as the active antiseptic agent an organic peroxidic compound and also including a substance which is a mutual solvent of saliva and of the oxygen chain compound whereby to facilitate liberation of nascent active oxygen in direct contact with the pathogenic organisms to be destroyed, said mutual solvent being characterized by its ability normally to inhibit decomposition of the peroxidic compound.

3. A chewing gum composition of the character set forth in claim 1 wherein sugar serves as the mutual solvent.

4. A composition for antisepsis of the oral cavity capable of being prepared in the form of a paste, powder, liquid or chewing gum, said composition being non-aqueous and including an alkaline material selected from the group consisting of sodium, potassium and calcium hydroxides, carbonates and salts of weak acids; said composition including as an active antiseptic agent an organic peroxidic compound and also including a substance which is a mutual solvent of saliva and of the peroxidic compound.

5. A composition for antisepsis of the oral cavity capable of being prepared in the form of a paste, powder, liquid or chewing gum, said composition being of substantial alkaline character and including as the active antiseptic agent an organic peroxidic compound and also including a substance which is a mutual solvent of saliva and of the peroxidic compound whereby to facilitate liberation of nascent active oxygen in direct contact with the pathogenic organisms to be destroyed, said mutual solvent being an organic hydroxy compound selected from the group consisting of ethyl alcohol and glycerol.

VAMAN R. KOKATNUR.